No. 729,179. PATENTED MAY 26, 1903.
E. HUBER.
STILL.
APPLICATION FILED OCT. 13, 1900.
NO MODEL.
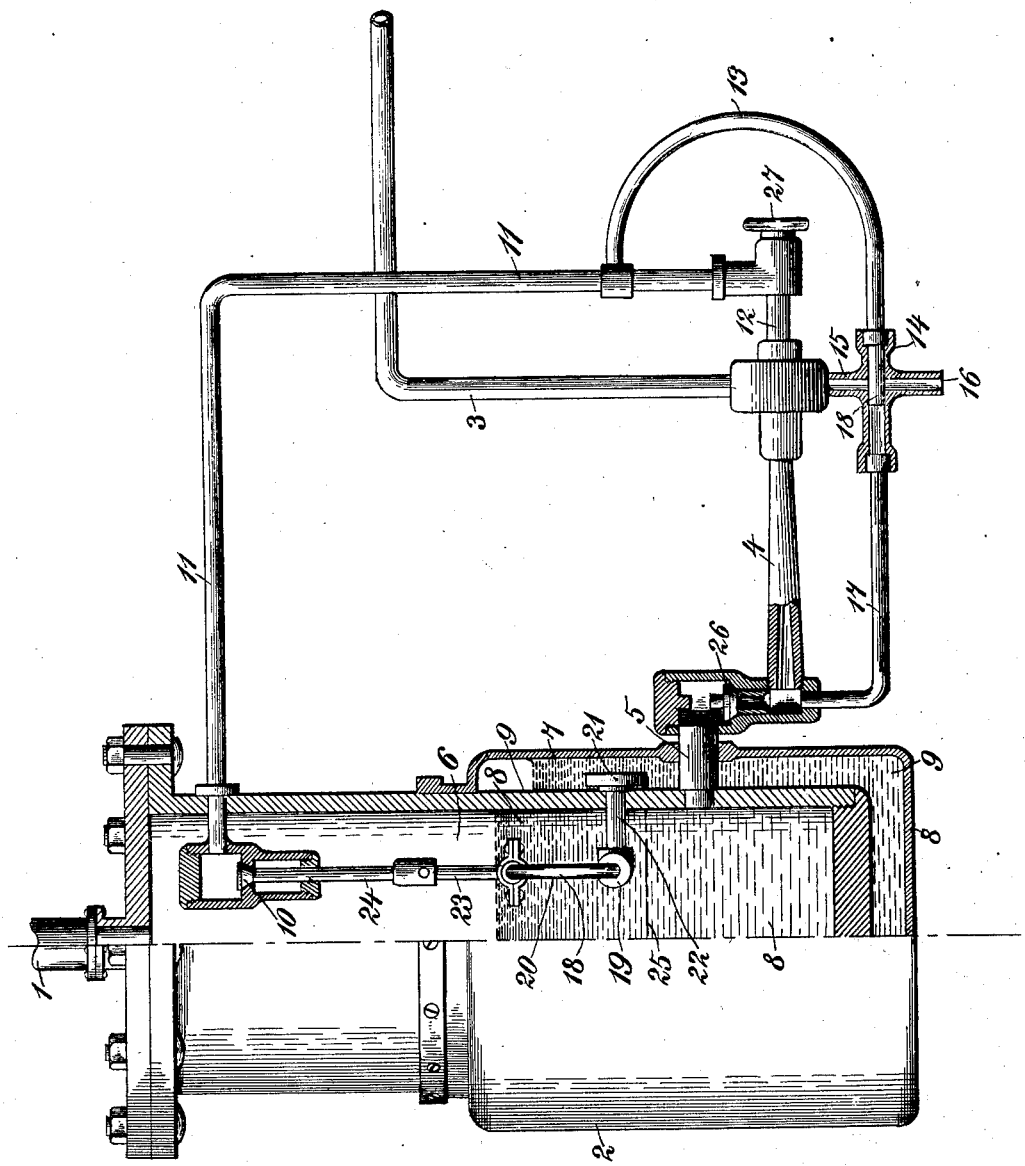
WITNESSES:
John O. Gempler
John A. Clark
INVENTOR
Ernest Huber
BY
Kenyon & Kenyon
ATTORNEYS No. 729,179. Patented May 26, 1903.

UNITED STATES PATENT OFFICE.

ERNEST HUBER, OF BROOKLYN, NEW YORK, ASSIGNOR OF FOUR-FIFTHS TO MYRON C. WICK, OF YOUNGSTOWN, OHIO, AND S. V. HUBER, OF PITTSBURG, PENNSYLVANIA.

STILL.

SPECIFICATION forming part of Letters Patent No. 729,179, dated May 26, 1903.

Application filed October 13, 1900. Serial No. 32,916. (No model.)

*To all whom it may concern:*

Be it known that I, ERNEST HUBER, a citizen of the United States, and a resident of New York city, borough of Brooklyn, in the county and State of New York, have invented certain new and useful Improvements in Stills, of which the following is a specification.

My invention relates to stills for evaporating liquids.

It has for its object to provide new and improved means for evaporating liquids—as, for example, ether—and for automatically regulating the supply of liquid ether thereto.

In the drawing accompanying this specification and forming a part hereof I have shown and will now proceed to describe the preferred form or embodiment of my invention. The drawing is a view of such preferred form of evaporator, partly in section, for more clearly showing the operation of the parts.

My device is intended, primarily, for use with a motor which uses a liquid, such as ether, which is evaporated, which then passes to the motor part of the machine and is then condensed and then returns to the still, or it may be employed, if desired, with any other apparatus for which it is suited.

2 represents the still, and 1 the supply-pipe passing from the still to the motor or other apparatus in which the gas generated in the still is to be employed. 3 is a pipe leading from any source of supply of the liquid—as, for example, a condenser. As the form or details of such motor and condenser form no part of my invention, they are not shown and will not be described. The liquid passes through the pipes 3, 4, and 5 into inner vessel 6 of still 2, where the liquid is evaporated, whence it passes out through pipe 1 to the motor or other apparatus. My improved devices are adapted for regulating the admission of the liquid into the still and for heating the still and evaporating the liquid therein. My improved devices are adapted and arranged so as to heat the liquid to evaporate it without permitting its temperature to rise to a dangerous point and also to automatically regulate the flow of the liquid into the still, so as automatically to maintain the level of the liquid in the still always within certain predetermined limits.

6 is an inner vessel for holding the liquid, and 7 is an outer surrounding vessel containing a liquid at a comparatively high boiling-point. Heat is applied directly to the outer vessel 7 and thence passes through the liquid 9 in the outer vessel to the inner vessel 6. Any suitable liquid can be used for the outer vessel which has a sufficiently high boiling-point. Where ether is used in the inner vessel, I find in practice that the use of glycerin for the outer vessel gives excellent results.

8 represents the liquid ether in the inner vessel, and 9 the glycerin in the outer vessel.

The automatic means for regulating the admission of the liquid into the still consists of the following devices:

10 is a valve in the upper part of inner vessel 6, controlling a port leading from that vessel into pipe 11. The latter pipe connects by pipe 12 with pipe 4 and also by pipe 13 with overflow device 14. This overflow device connects by pipe 15 at the junctions of pipes 3 and 4 by a pipe 16 with the condenser or other source of supply of the liquid. Pipe 17 connects the farther end of pipe 4 with the overflow device.

18 is a valve adapted to slide in overflow device 14, so as to open or close the connection between pipes 13 and 15 with pipe 16.

Valve 10 is opened and closed automatically by means of a governor. This governor may be of any suitable form. As shown, it is made in the usual elliptic shape, having a chamber 19, in which a small quantity of ether or other suitable substance is placed, to which a highly-elastic steel pipe 20, bent into elliptical shape, is connected. Chamber 19 is connected to a metallic body or mass 21, submerged in glycerin in the outer vessel, by means of metallic connections, such as metallic rod 22, passing through the wall of the inner vessel. The upper part of elliptical steel pipe 20 is connected to a rod 23, the latter carrying a rod 24, upon which valve 10 is mounted. When the governor is submerged in the liquid ether, as shown in the drawing, valve 10 is down upon its seat and closes the port leading into pipe 11. When the liquid has by evaporation sunk below the governor—say to the point indicated by the dash-and-dot line 25—the heat conducted through mass 21 and rod 22 is no longer absorbed by the surrounding liquid in the same proportion as formerly, rod 22 grows warmer, the glycerin in the outer vessel near the surface grows warmer, and as a result of consequent higher temperature in chamber 19 the pressure becomes greater within the governor, thus tending to lengthen the short axis of the ellipse, and thereby lifting valve 10 from its seat, thus permitting ether-gas to rush through pipes 11, 12, and 4. These pipes constitute substantially an injector operated in the following manner: When the gas from the inner vessel 6 begins to rush through pipe 11, it also passes through pipe 13, throwing valve 18 to the left and opening the passage from pipe 11 through pipe 13 to pipe 16 and from pipe 3 through pipe 15 to pipe 16. This establishes a flow of the liquid downward through pipe 3, and when it has attained sufficient momentum it passes through pipe 4, forcing upward valve 26, located between pipes 4 and 5, against pressure in the inner vessel, thus establishing a flow of liquid ether into that vessel. At the same time this pressure forces valve 18 to the right, closing the passage-way to pipe 16. The flow of gas and liquid ether continues into chamber 6 until the level of the liquid ether has again risen to substantially the point shown in the drawing. Thereupon the heat in the rod 22, chamber 19, and steel rod 20 is diminished, and the ellipse resumes its normal shape, closing valve 10. By these means whenever the level of the ether in the still falls below a certain predetermined point a flow of liquid ether from the condenser or other source of supply into the still will be established and will continue until the level of the liquid in the still rises to substantially a predetermined point, when it will automatically cease, as above described. I am thus enabled to maintain automatically the level of the liquid in the still within certain predetermined limits. Valve 27 controls the flow of gas to the injector.

Governor 20 being well known and forming in its details no part of my invention, full details of it are not shown and will not be further described.

Any suitable means may be employed for heating the still—as, for example, a burner of any suitable form placed under the still. I prefer in practice to also provide a suitable governor for controlling the supply of fluid to the burner; but as this forms no part of the present invention it is not shown and will not be described.

By means of my improved device an endless cycle can be formed, the same liquid being evaporated, condensed, returned to the still, evaporated again, and so on, the same liquid being used over and over again.

Many modifications and changes may be made in and from the device shown in the drawing without departing from my invention.

What I claim as new, and desire to secure by Letters Patent, is—

1. In a still for evaporating liquid ether (or other similar liquid) the combination of an inner vessel for the ether or similar liquid and an outer surrounding vessel, to which the heat is adapted to be applied, containing a liquid of comparatively high boiling-point, a metallic body in the outer vessel and metallic connections between it and a metallic body in the inner vessel, whereby heat applied to the outer vessel will pass through the said liquid in the outer vessel and the said metallic bodies and their connections, substantially as set forth.

2. In a still for evaporating liquid ether (or other similar liquid) the combination of an inner vessel for the ether or similar liquid, and an outer surrounding vessel, to which the heat is adapted to be applied, containing a liquid of comparatively high boiling-point, whereby heat applied to the outer vessel will pass through the said liquid in the outer vessel before reaching the inner vessel, a pipe for supplying ether or other liquid to the inner vessel, a valve therein, means automatically actuated for opening said valve when the level of the ether or other liquid falls beyond a certain point and for closing it when the said level rises beyond a certain point, whereby the level of liquid in the inner vessel will be automatically maintained within certain predetermined limits and a pipe for the escape of the ether or other gas therefrom.

3. In a still for evaporating liquid ether, (or other similar liquid) the combination of an inner vessel for the ether or similar liquid, and an outer surrounding vessel, to which the heat is adapted to be applied, containing glycerin, whereby heat applied to the outer vessel will pass through the said liquid in the outer vessel before reaching the inner vessel, whereby excessively high temperatures in the inner vessel will be avoided.

4. In a still for evaporating liquid ether (or other similar liquid) the combination of an inner vessel for the ether or similar liquid and an outer surrounding vessel, to which the heat is adapted to be applied, containing a liquid of comparatively high boiling-point, whereby heat applied to the outer vessel will pass through the said liquid in the outer vessel, a pipe for supplying ether or other liquid to the inner vessel, a valve therein, an injector connected with said pipe, a pipe leading from the part of the inner vessel, which holds the gas, to the injector for the flow of gas from the said vessel to the injector, a valve connected with said pipe, means for automatically controlling said valve adapted when submerged by the liquid to automatically close the valve and when the level of the liquid has fallen so as to expose said means, to automatically open said valve, a pipe leading from the source of supply of liquid ether or other liquid to the injector and connecting with the pipe leading from the still to the injector, whereby the level of liquid ether or other liquid will be automatically maintained within certain predetermined limits, and a pipe for the discharge of ether or other gas from the still.

5. In a still for vaporizing liquid ether (or other similar liquid), the combination of an inner vessel for the ether or similar liquid, and an outer surrounding vessel containing a liquid at comparatively high boiling-point, a metallic body in the outer vessel adapted to be surrounded by the liquid therein, a metallic body in the inner vessel adapted to be surrounded by the liquid therein, metallic connections between the said bodies, and means for heating the outer vessel, whereby heat applied to the outer vessel will pass through the liquid in the outer vessel and be conveyed through the said metallic bodies and their connections to the liquid in the inner vessel.

In testimony whereof I have signed my name to this specification in the presence of two subscribing witnesses.

ERNEST HUBER.

Witnesses:
 JOHN O. GEMPLER,
 EDWIN SEGER.